REEL SUPPORT

Filed Dec. 28, 1964 2 Sheets-Sheet 1

INVENTOR.
ROBERT A. PENDLETON

BY Fred Jacob

ATTORNEY

Sept. 13, 1966 R. A. PENDLETON 3,272,450

REEL SUPPORT

Filed Dec. 28, 1964 2 Sheets-Sheet 2

INVENTOR.
ROBERT A. PENDLETON

BY Fred Jacob

ATTORNEY.

United States Patent Office 3,272,450
Patented Sept. 13, 1966

3,272,450
REEL SUPPORT

Robert A. Pendleton, Dedham, Mass., assignor to Honeywell Inc., Minneapolis, Minn., a corporation of Delaware Filed Dec. 28, 1964, Ser. No. 421,362
8 Claims. (Cl. 242—68.3)

The present invention relates, in general, to new and improved apparatus for removably mounting an object, in particular to an improved mount for a removable tape reel.

It is common practice in present-day magnetic tape transports to have tape reels which are removable. In this manner, different computer programs and other information may be preserved in a library of tapes, each spooled on its own tape reel. These reels are stored in racks from which they are removed during the operation of the computer, when the particular information stored on the tape is required. A reel mount located on the tape transport must be capable of accepting the reel and retaining it firmly in position thereafter, so that the reel will run true as the mount rotates upon actuation by a reel drive motor.

The operation of a high-speed data transport imposes relatively severe requirements on the ability of the reel mount to hold the tape reel in place. A rapid acceleration or deceleration of the tape reel may occur where the tape reel is brought up to speed from a dead stop or when it is brought to a rapid halt. Such accelerations and decelerations are particularly large when a reversal of the direction of reel rotation is called for. If the inertia of the tape reel is appreciable, as is the case when the reel is fully spooled with tape, the holding ability of the reel mount is severely tested when the conditions discussed above occur.

The ability to hold the tape reel securely in position during the operation of the tape transport must be consistent with the requirements for ready removal or installation of the tape reel on the reel mount by a relatively unskilled operator. In prior art tape transports this is generally not the case and as a consequence an undue amount of time must be spent by the operator in installing or removing tape reels from the tape transport. The reels of a single tape transport are frequently changed more than once during a single computer run. More than one tape transport may be used to permit the running of several programs in parallel on the computer. Since a tape transport is idle while a reel is being changed, the capacity of the associated computer may not be fully utilized. It is important, therefore, that the time required for changing tape reels be as brief as possible.

Accordingly, it is the primary object of the present invention to provide a simple and economical mount which is not subject to the foregoing disadvantages.

It is another object of the present invention to provide a reel mount which requires only a minimum amount of time and skill for the installation or removal of a tape reel and which is capable of securely retaining the installed tape reel in place in a prescribed manner under severe operating conditions.

These and other objects of the present invention together with the features and advantages thereof will become apparent from the following detailed specification when read together with the accompanying drawings in which.

Figure 1:
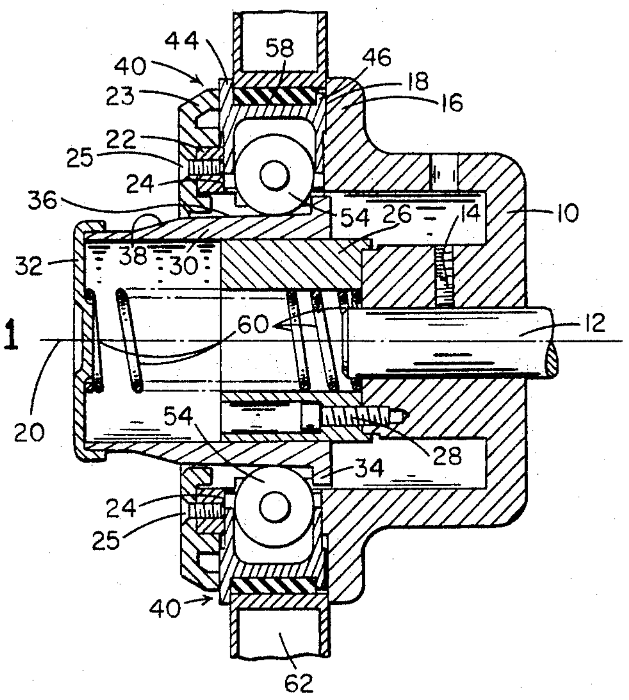
FIGURE 1 illustrates a preferred embodiment of the present invention.

With reference now to the drawings, FIGURE 1 shows a reel mount wherein a hub 10 has a central portion which engages the shaft 12 of a reel drive motor by means of a set screw 14. The shaft 12 coincides with the hub axis 20. An outer hub portion, coaxial with the central portion and spaced therefrom, terminates in a flange 16, which has a surface 18 that is at right angles to the hub axis 20. The surface 18 faces in a forward direction, i.e. to the left in the drawing. The hub further includes a hollow, coaxial cylindrical portion 22 which extends forward of the flange 16 and which contains a plurality of radially directed holes 24 regularly spaced about its periphery.

A guide bushing 26 is positioned coaxially forward of the hub and is affixed to the central hub portion by means of screws 28. The guide bushing 26 and the cylindrical hub portion 22 define an annular space in which a sleeve 30 is coaxially positioned. The sleeve protrudes forward through a central hole in a mask 23, which is itself affixed to the hub portion 22 by means of screws 25. The mask functions to keep dirt out of the interior of the mount. The forward end of the sleeve 30 is closed by means of a cap 32, while the rearward sleeve end terminates in a flange 34. The sleeve 30 is slidably disposed on the guide bushing 26 and is movable relative to the hub 10 in an axial direction.

Figure 2:
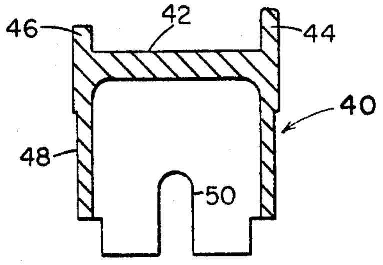
FIGURE 2 illustrates a portion of the apparatus of FIGURE 1 in enlarged detail.

The outer sleeve surface tapers downward in the forward direction, two distinct tapers 36 and 38 being provided in the illustrated preferred embodiment. A plurality of generally T-shaped collet pieces 40 is disposed around the cylindrical hub portion 22, each collet piece extending radially inward through one of the holes 24. A representative collet piece is shown in enlarged detail in FIGURE 2, as well as in FIGURE 4 where two adjacent collet pieces are illustrated in operating position. Each collet piece is seen to have a curved surface 42 which faces radially outward when the collet piece is positioned in its corresponding hole 24. In the preferred embodiment of the invention, six collet pieces are regularly spaced around the cylindrical hub portion 22 so that the curved collet surfaces 42 jointly define a substantially circular periphery. Each collet piece includes a forward flange 44 and a rear flange 46, both having a curvature similar to that of the curved surface 42. The rear flange 46 is smaller than the forward flange and abuts the hub flange surface 18 when the collet piece is in its mounted position.

Each collet piece includes a substantially cylindrical extension 48 which protrudes through the corresponding hole 24 in the cylindrical hub portion 22. The extension 48 includes a pair of transverse slots 50 and 52, the slot 52 extending substantially in a radial direction when the collet piece is in position. The slot 50 extends in a direction at right angles to both the radius and the hub axis 20.

Figure 3:
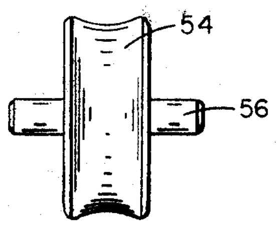
FIGURE 3 illustrates a further detail of the apparatus of FIGURE 1.
Figure 4:
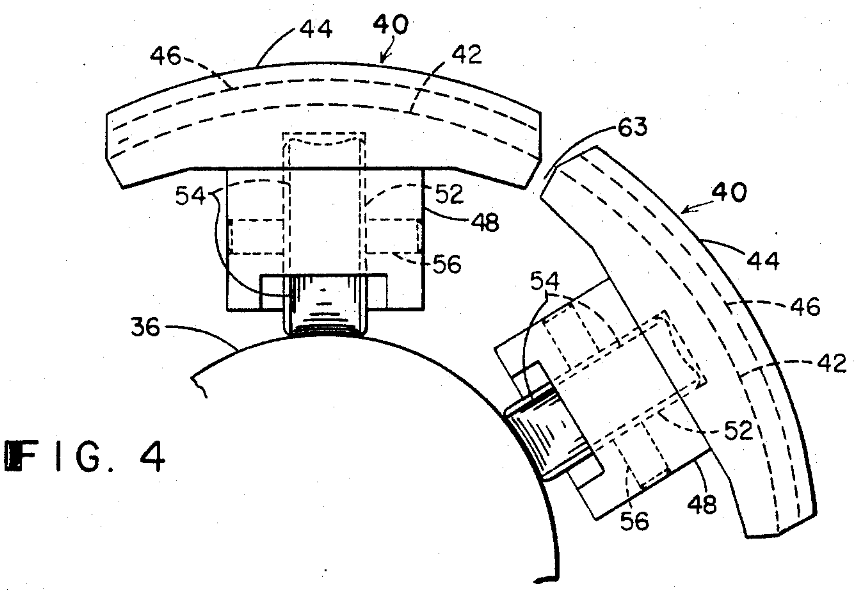
FIGURE 4 illustrates a sub-assembly including the parts shown in FIGURES 2 and 3.

FIGURE 1 further shows a roller disc 54 in position with each collet piece. This is illustrated in enlarged detail in FIGURE 3, where the disc portion 54 is seen to be positioned on a shaft 56. The relationship between the roller and the collect piece extension 48 is shown in FIGURE 4, where the roller shaft 56 is seen to be rotatably disposed in one of the transverse slots 50. The roller disc portion 54 is positioned in the slot 52 and protrudes outward in a radial direction when the collect piece is in position. The latter relationship is further illustrated in FIGURE 1 where the protruding roller disc portion 54 is seen to be in contact with the tapered outer surface of the sleeve 30.

A continuous, resilient rubber band 58 surrounds the aforesaid periphery which is jointly defined by the curved surfaces 42 of all the collet pieces. The rubber band 58 is approximately the width of the surfaces 42 and is guided by the flanges 44 and 46. The thickness of the band is greater than the height of the rear flange 46. The rubber band, being under tension, urges the collet pieces radially inward. This action causes the roller disc portions 54 to apply pressure against the tapered outer surface of the sleeve 30.

A compression spring 60 is positioned between the control portion of the hub 10 and the sleeve cap 32 and is partially disposed inside the guide bushing 26. The normal action of the compression spring urges the sleeve in a forward direction to the left in FIGURE 1 to force a rising portion of the tapered sleeve surface 36, i.e. a surface portion of increasing diameter, underneath the roller discs 54. The limit of the forward sleeve motion is reached when the sleeve flange 34 makes contact with a portion of each collet piece extension 48 which protrudes inside the cylindrical hub portion. The extreme forward position of the sleeve 30 is shown in FIGURE 1 of the drawings. It will be noted that the roller discs have moved to their maximum radial distance from the axis 20 against the force applied to the collect pieces by the rubber band 58. This is the normal condition of the mount wherein the mutual spacing 63 of the collet pieces, as well as the jointly defined outer periphery, is at its maximum. As see from FIGURE 4, the mutually facing collet piece surfaces define successive sectors around the common axis.

The rubber band 58 provides a friction surface which is adapted to hold a tape reel 62 in position by pressing against the cylindrical interior surface of the latter. When mounted, the tape reel is further positioned by the forward collet piece flange 44 and by the surface 18 of the hub flange 16, both of which serve to establish the true position of the reel. When it is desired to remove the tape reel, pressure is applied by the operator against the cap 32 to overcome the force of the compression spring 60. This action causes the sleeve 30 to be pushed to the rear (to the right in the drawing) and a tapered sleeve surface portion of decreasing diameter moves underneath the roller discs 54. With the compression spring collapsed by the externally applied pressure, the tension of the rubber band 58 causes the collet pieces to move radially inward, as permitted by the decreased sleeve diameter. The outer friction surface of the rubber band, which was previously in contact with the interior surface of the tape reel 62, now contracts to free the tape reel.

As seen from FIGURE 1, the tapered sleeve surface 36 gives way to a surface 38 having a more abrupt taper as the sleeve 30 is pushed to the rear. When this point is reached, the rubber band 58 collapses the periphery defined by the collet pieces sufficiently for the tape reel to clear the forward flanges 44 of the collet pieces. As the rubber band contracts, the mutual spacing 63 of the adjacent collet pieces decreases. The limit is reached when adjacent collet pieces abut each other. In this position, the installation or the removal of a tape reel is readily facilitated.

From the foregoing discussion of a preferred embodiment of the present invention, it will be seen that a tape reel mount is provided which has an expandable periphery whose friction surface is capable of firmly holding a tape reel in place by contacting the interior hub surface of the tape reel. A pair of flange surfaces insures that the tape reel is mounted true, i.e. at right angles to the axis 20. The reel mount of the present invention is capable of quickly accepting or releasing a tape reel, such operations being readily performed by an unskilled operator and requiring only the application of pressure against the cap 32 while the reel hub is slipped over the mating mount hub.

Various modifications may be effected within the scope of the present invention. For example, it is possible to provide a hexagonal sleeve. Alternatively, individual inclined surfaces may be provided in a sleeve whose outer surface is otherwise substantially cylindrical. Each of the inclines could be capable of accepting a roller disc. The roller disc are not themselves required, but could be replaced by means of a fixed surface which is capable of making sliding contact with the aforesaid inclined surface.

While the use of the guide bushing as a part separate and distinct from the hub 10 permits the choice of a suitable low friction material for the bushing, the latter could be formed as part of the hub. Indeed, a complete bushing need not be provided, the only requirement being for structure to guide the movement of the sleeve 30 in axial direction. This is also true for the arrangement of the holes 24 in the hub portion 22 and the mating extensions 48 of the collet pieces. In place of the cylindrical hub portion, which performs the dual function of serving as a guide for the radial movement of the collet pieces and to define the annular space which accommodates the sleeve 30, a different arrangement could be employed for guiding the movement of the collet pieces.

It will thus be apparent that numerous modifications and departures, as explained above, will now occur to those skilled in the art, all of which fall within the true spirit and scope contemplated by the present invention.

What is claimed is:

1. A reel mount comprising a hub including a hollow hub portion centered about a hub axis, a sleeve coaxially positioned within said hub portion and having a tapered outer surface, said sleeve terminating in a cap at its forward end and in a flange at its rearward end, guide means permitting a sliding movement of said sleeve in an axial direction relative to said hub, a plurality of mutually spaced collet pieces surrounding said hub portion including discrete curved surfaces jointly defining a substantially circular coaxial periphery, each of said collet pieces having an extension slidingly protruding inward through a corresponding opening in the wall of said hub portion to permit movement of said collet piece in a radial direction, a roller rotatably disposed in each of said collet piece extensions and contacting said tapered sleeve surface, means for resiliently biasing said collect pieces radially inward, resilient means in contact with said sleeve cap for normally urging said sleeve in a forward axial direction until said sleeve flange abuts said collet piece extensions, said last recited resilient means being adapted to force a rising portion of said tapered sleeve surface beneath each of said rollers, said last recited action causing said collet pieces to move radially outward in opposition to said biasing means to expand the periphery defined by said curved surfaces, whereby the selective application of force to said sleeve cap in a rearward direction is adapted to contract said periphery below the inside diameter of a tape reel to be mounted.

2. The apparatus of claim 1 wherein said biasing means comprise a resilient tension band in contact with said curved collet surfaces, said band including an outer friction surface for mounting a reel thereon, and a pair of flanges on each collet piece adapted to retain said band in place.

3. The apparatus of claim 1 wherein the taper of said sleeve surface varies along the axial length of said sleeve.

4. The apparatus of claim 1 wherein said means for urging said sleeve in a forward axial direction comprise a compression spring positioned within said sleeve between said hub and the sleeve cap.

5. A reel mount comprising a hub adapted to be affixed to a drive shaft, said hub including an annular flange coaxial with and at right angles to the shaft axis, a hollow cylindrical hub portion coaxially extending forward of said flange and including a plurality of radial holes regularly spaced around said axis, a guide bushing coaxial with said hub and affixed thereto to define an annular space between the outer bushing surface and the interior surface of said cylindrical hub portion, a sleeve coaxially disposed in said annular space and slidably engaging said guide bushing, said sleeve including an outer surface tapering downward in the forward direction, said sleeve having a cap at one end forward of said annular space and including a flange at the opposite end, plurality of mutually spaced collet pieces coaxially surrounding said cylindrical hub portion, each collet piece including a curved surface facing outward from said hub portion and bordered by a pair of similarly curved collet flanges, the rear flange of each of said pairs abutting said hub flange, said curved collet surfaces jointly defining a substantially cylindrical surface coaxial with said hub portion, each of said collet pieces further including a cylindrical inward extension slidably engaging one of said holes to permit the movement of said collet piece in a radial direction, a pair of mutually transverse slots in each of said extensions, an annular rubber band surrounding the curved outward facing surfaces of said collet pieces and adapted to urge the latter radially inward, the periphery of said rubber band defining a friction surface adapted to retain a reel, a roller corresponding to each of said collet pieces and comprising a cylindrical disc affixed to a central shaft, each roller shaft being positioned in one slot of a collect piece extension substantially at right angles to said axis, the surface of said cylindrical disc protruding from the transverse slot and being in contact with said tapered sleeve surface when said roller is in place, and a compression spring disposed between said hub and said sleeve cap, said spring urging said sleeve in a forward direction until said sleeve flange abuts said collet piece extensions, the forward movement of said sleeve forcing tapered sleeve surface portions of increasing diameter into contact with said rollers to expand the periphery of said rubber band, whereby the selective application of pressure in a rearward direction to said sleeve cap, in opposition to the action of said compression spring, is adpated to contract the periphery of said rubber band sufficiently to enable said mount to accept the inside diameter of a removable reel.

6. The apparatus of claim 5 wherein the forward portion of said sleeve surface has a steeper taper than the rearward portion.

7. The apparatus of claim 5 wherein the flanges of each of said collet pieces extend radially beyond the corresponding curved surface to retain said rubber band in place, the forward flange extending beyond said band to define a space with said hub flange adapted to retain a reel therebetween.

8. The apparatus of claim 5 wherein the mutually facing surfaces of successive collet pieces lie in respective planes which define successive sectors centered about said axis, the minimum periphery of said rubber band being reached when said facing surfaces make contact.

References Cited by the Examiner

UNITED STATES PATENTS 3,124,319 3/1964 Cohen et al. -------- 242—68.3

FRANK J. COHEN, *Primary Examiner.*

STANLEY N. GILREATH, *Examiner.*

N. L. MINTZ, *Assistant Examiner.*